United States Patent
Kasparian et al.

(10) Patent No.: US 9,902,484 B2
(45) Date of Patent: Feb. 27, 2018

(54) FLIGHT DECK ARRANGEMENT

(71) Applicant: Gulfstream Aerospace Corporation, Savannah, GA (US)

(72) Inventors: Aram Kasparian, Savannah, GA (US); Tristan Flynn, Savannah, GA (US); Robert Magyarosi, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 82 days.

(21) Appl. No.: 14/866,215

(22) Filed: Sep. 25, 2015

(65) Prior Publication Data
US 2016/0101844 A1 Apr. 14, 2016

Related U.S. Application Data

(60) Provisional application No. 62/063,379, filed on Oct. 13, 2014.

(51) Int. Cl.
*B64C 1/14* (2006.01)

(52) U.S. Cl.
CPC .............. *B64C 1/1484* (2013.01); *B64C 1/14* (2013.01)

(58) Field of Classification Search
CPC ...... B60J 3/0204; B60J 3/0213; B60J 3/0217; B60J 3/0234; B60J 3/0239; B64C 1/14; B64C 1/1484
See application file for complete search history.

(56) References Cited

U.S. PATENT DOCUMENTS

| | | | | | |
|---|---|---|---|---|---|
| 1,180,589 | A | * | 4/1916 | Kubat | B60J 3/0217 160/370.21 |
| 1,795,184 | A | * | 3/1931 | Smith | B60J 3/0234 248/289.11 |
| 1,838,653 | A | * | 12/1931 | Bergman | B60J 3/0204 248/289.11 |
| 1,988,511 | A | * | 1/1935 | Rabbit | B60J 3/0213 296/97.13 |
| 2,235,421 | A | * | 3/1941 | Devine | B60J 3/0234 248/278.1 |
| 2,264,603 | A | * | 12/1941 | Westrope | B60J 3/0239 296/97.11 |
| 2,294,317 | A | * | 8/1942 | Pelcher et al. | B60J 3/0239 296/97.11 |
| 6,909,408 | B2 | * | 6/2005 | Matko et al. | B60J 3/0204 296/97.2 |

(Continued)

FOREIGN PATENT DOCUMENTS

| FR | 1341668 A | * 11/1963 | ............ B60J 3/0213 |
|---|---|---|---|
| FR | 2265584 A1 | * 10/1975 | ............ B60J 3/0204 |

*Primary Examiner* — Glenn Dayoan
*Assistant Examiner* — Paul Chenevert
(74) *Attorney, Agent, or Firm* — LKGlobal | Lorenz & Kopf, LLP

(57) ABSTRACT

A flight deck arrangement includes, but is not limited to, a window. The flight deck arrangement further includes a surface disposed proximate the window and positioned below the window. The flight deck arrangement further includes a rail mounted to the surface. The rail is disposed proximate the window and positioned below the window. The rail extends along the surface in a direction generally aligned with a lower portion of the window. The flight deck arrangement still further includes a visor mounted to the rail and selectively positionable along the rail.

20 Claims, 4 Drawing Sheets

(56) References Cited

U.S. PATENT DOCUMENTS

| | | | |
|---|---|---|---|
| 7,344,260 B2* | 3/2008 | Derenski | B60J 3/02 296/97.4 |
| 7,505,136 B2* | 3/2009 | Romig et al. | B64C 1/1484 250/221 |
| 7,695,046 B2* | 4/2010 | Osbourne et al. | B60J 3/0213 244/118.5 |
| 2017/0072774 A1* | 3/2017 | Kim et al. | B60J 3/0208 |

* cited by examiner

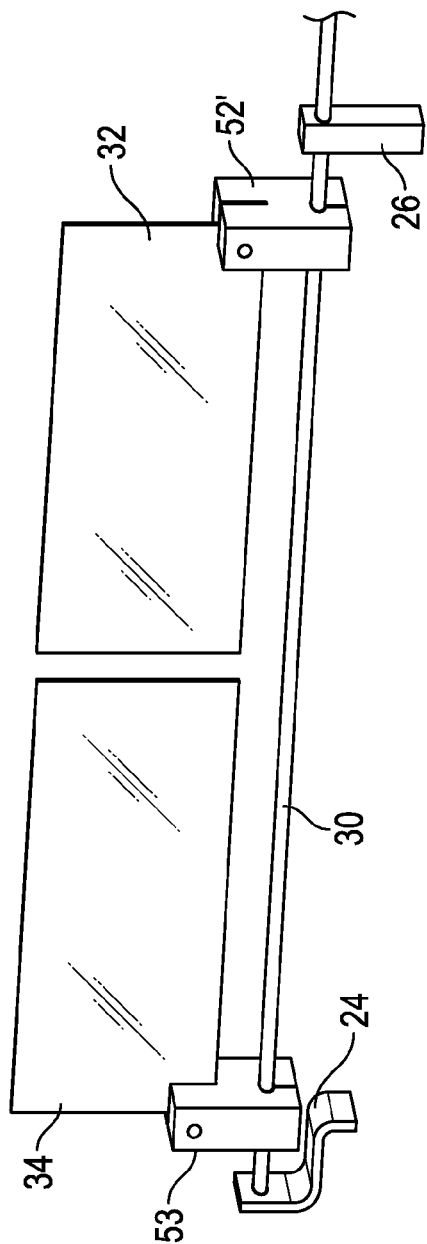
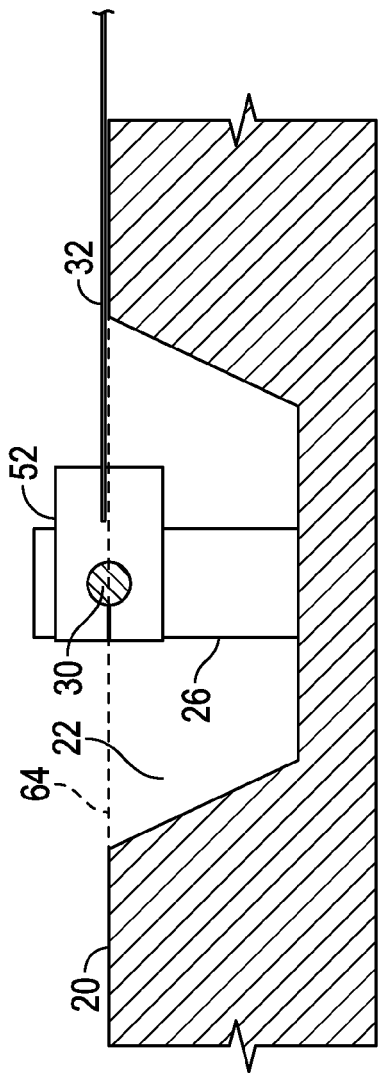

FLIGHT DECK ARRANGEMENT

CROSS-REFERENCE TO RELATED APPLICATIONS

This application claims the benefit of U.S. Provisional Patent Application 62/063,379, filed on 13 Oct. 2014 and entitled "Glare Shield Rail," which is hereby incorporated herein by reference in its entirety.

TECHNICAL FIELD

The present invention generally relates to aircraft and more particularly relates to flight deck arrangements.

BACKGROUND

The sun can be a nuisance to members of a flight crew seated in the flight deck of an aircraft during daytime flight operations. Sunlight entering the flight deck of the aircraft can flood the flight deck with bright light leaving the flight crew unable read displays and/or instruments. At night, illumination from instruments, readouts, and display screens can reflect off of the windshield and obstruct or obscure the flight crew's view through the windshield.

While there are devices available to block sunlight from entering the flight deck, such devices often provide less blockage than is desired. For example, one device that is commonly used to inhibit sunlight from entering the flight deck is a window shade. The window shade is commonly mounted vertically to a pillar adjacent a flight deck window pane and is configured to be pulled/unrolled so that it extends to a second pillar on the opposite side of the pane. Often, the contours of the window shade do not precisely match the contours of the window pane, leaving regions of the flight deck window unobstructed which, in turn, permits sunlight to enter the flight deck. Similarly, for nighttime operations, there are devices that are available to minimize reflections. For example, one device that is commonly used to inhibit reflections is a glare shield. This is a hood that protrudes over the instruments and that obstructs light from the instruments from reaching the windshield. The dimensions of the glare shield are often smaller than the dimensions of the instruments it is intended to shield and so there is frequently some light leakage.

It is desirable to provide a flight deck arrangement that addresses the above described situation. Furthermore, other desirable features and characteristics will become apparent from the subsequent summary and detailed description and the appended claims, taken in conjunction with the accompanying drawings and the foregoing technical field and background.

BRIEF SUMMARY

A flight deck arrangement is disclosed herein.

In a first non-limiting embodiment, the flight deck arrangement includes, but is not limited to, a window. The flight deck arrangement further includes, but is not limited to a surface disposed proximate the window and positioned below the window. The flight deck arrangement further includes, but is not limited to a rail mounted to the surface. The rail is disposed proximate the window and positioned below the window. The rail extends along the surface in a direction generally aligned with a lower portion of the window. The flight deck arrangement still further includes, but is not limited to a visor that is mounted to the rail and that is selectively positionable along the rail.

In a second non-limiting embodiment, the flight deck arrangement includes, but is not limited to, a forward facing window including a first pane and a second pane. The flight deck arrangement further includes, but is not limited to, a glare shield disposed proximate the forward facing window and positioned below the forward facing window. The glare shield includes a recess defined in an upper surface of the glare shield. The recess extends in a direction generally aligned with the forward facing window. The flight deck arrangement further includes, but is not limited to, a first stanchion. The flight deck arrangement further includes, but is not limited to, a second stanchion. The flight deck arrangement further includes, but is not limited to, a third stanchion. The flight deck arrangement further includes, but is not limited to, a rail mounted to the glare shield via the first stanchion, the second stanchion, and the third stanchion. The rail is mounted within the recess. The first stanchion engages the rail at a first longitudinal end of the rail. The second stanchion engages the rail at a second longitudinal end of the rail. The third stanchion engages the rail proximate a center of the rail. The rail is disposed proximate the window and positioned below the window. The rail extends along the glare shield in a direction generally aligned with a lower portion of the window. The rail extends along the glare shield for a length substantially equal a combined length of the first pane and the second pane. The flight deck arrangement further includes, but is not limited to, a first visor mounted to the rail between the first stanchion and the third stanchion and selectively positionable along the rail. The flight deck arrangement still further includes, but is not limited to, a second visor mounted to the rail between the second stanchion and the third stanchion and selectively positionable along the rail.

BRIEF DESCRIPTION OF THE DRAWINGS

The present invention will hereinafter be described in conjunction with the following drawing figures, wherein like numerals denote like elements.

FIG. 7 is a perspective view illustrating a portion of the flight deck arrangement of FIG. 1 in a different configuration; and FIG. 8 is a fragmentary side view illustrating a portion of the flight deck arrangement of FIG. 1 seated within a recess.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved flight deck arrangement is disclosed herein. In a non-limiting embodiment, the flight deck arrangement of the present disclosure includes a forward looking flight deck window and a surface positioned near the forward looking flight deck window. Mounted to the surface is a rail configured to receive a visor. A visor is mounted to the rail in either a removable manner or a non-removable manner. Once mounted to the rail, the visor can be raised to a generally vertical position when shade from the sun is desired and flattened to avoid obstructing the view of the aircrew members when shade is not desired. The visor can be moved along the rail to any desirable position and can be positioned to extend beyond the lateral ends of the glare shield to protect the windshield from reflections that the glare shield cannot obstruct. In some embodiments, the visor may be in a flat orientation when acting as an extension of the glare shield while in other embodiments, it may be oriented at any suitable angle. Multiple visors may be mounted to the rail.

In some embodiments, the rail may include splining. A clasp or other mechanism securing the visor to the rail may have reciprocal splining that permits the visor to be adjusted to a plurality of different detent positions. Such splining may support the visor at a desired orientation and may assist in maintaining the visor in the desired orientation despite the vibrations imparted by the aircraft as a result of flight operations.

A greater understanding of the flight deck arrangement described above may be obtained through a review of the illustrations accompanying this application together with a review of the detailed description that follows.

Figure 1:
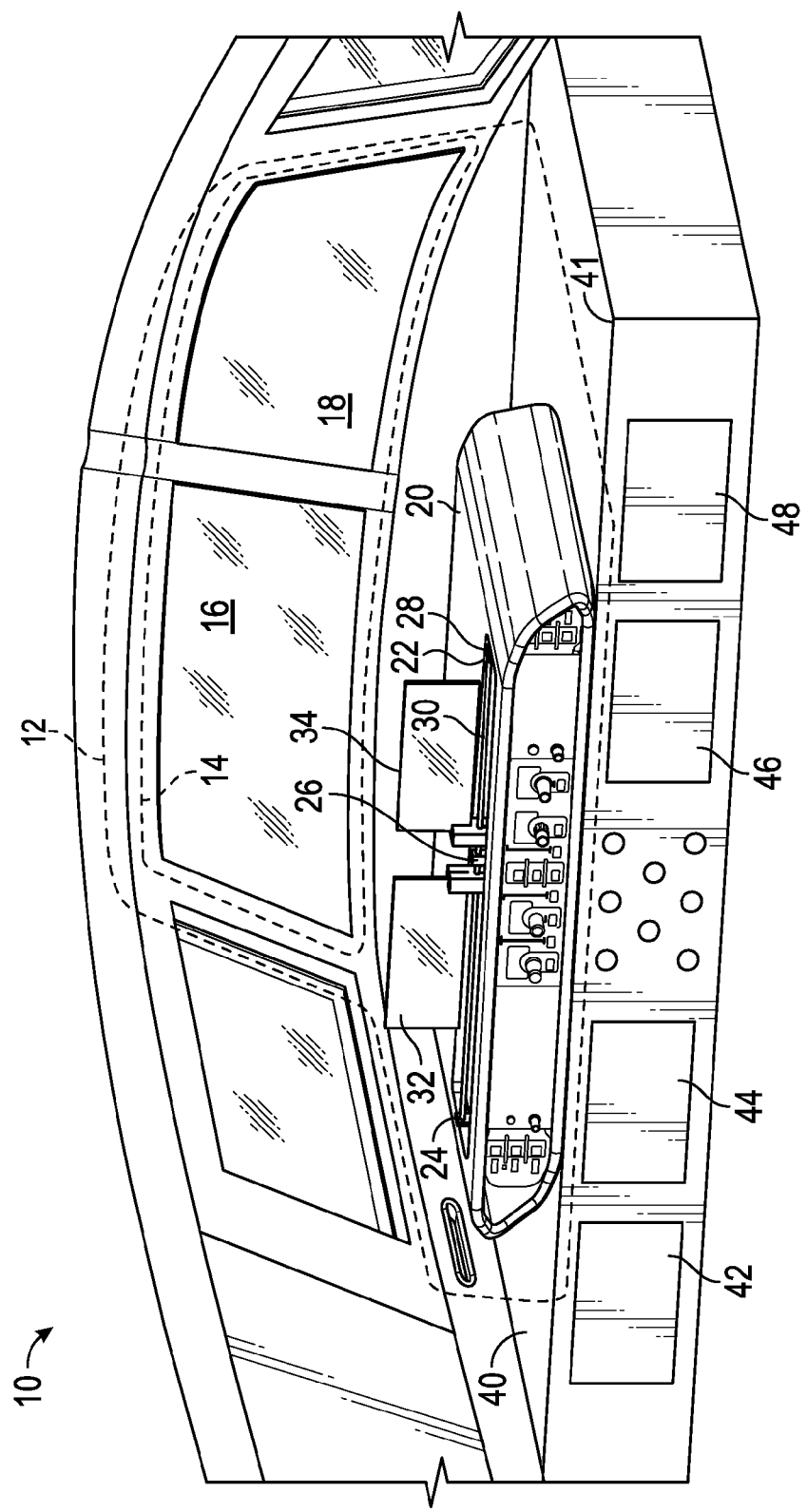
FIG. 1 is a perspective view of an interior of a flight deck equipped with a non-limiting embodiment of a flight deck arrangement made in accordance with the teachings of the present disclosure.

FIG. 1 is a perspective view illustrating a flight deck 10 equipped with an embodiment of a flight deck arrangement 12. In the illustrated embodiment, flight deck arrangement 12 includes a forward facing window 14 including a pane 16 and a pane 18. Flight deck arrangement 12 further includes a glare shield 20 having a recess 22. Flight deck arrangement 12 further includes a left (first) stanchion 24, a center (third) stanchion 26, and a right (second) stanchion 28. Stanchions 24, 26, and 28 are mounted in recess 22. Flight deck arrangement 12 further includes a rail 30 mounted on, and supported by, stanchions 24, 26, and 28. Rail 30 has a length that is substantially equal to a lateral length of window 14. As used herein, when reference is made to a "lateral length" of window 14, it should be understood as meaning the length of window 14 as measured in the lateral direction of flight deck 10. Thus, despite its actual length, because of its contour or its mounting angle, its lateral length will be smaller. Flight deck arrangement 12 further includes a left visor 32 and a right visor 34. While in the illustrated embodiment, flight deck arrangement 12 includes forward facing window 14, it should be understood that the teachings herein would apply equally to any window in flight deck 10, not merely those that face forward.

Rail 30 may be made of any suitable material including metals such as aluminum. Visors 32 and 34 may be made of opaque materials or, alternatively, of a translucent material such as Lexan that lets some, but not all light pass through. Stanchions 24, 26, and 28 may be made of any suitable material including, but not limited to metals such as aluminum and/or polymeric materials.

Glare shield 20 extends beyond an edge 41 of a instrument panel 40. Instrument panel 40 houses a display 42, a display 44, a display 46, and a display 48. Because glare shield 20 extends beyond edge 41, glare shield 20 overhangs display 44 and display 46 and therefore provides shade to display 44 and display 46. The presence of glare shield 20 in flight deck 10 ensures that the information presented on displays 44 and 46 will remain visible to air crew members on sunny days despite the intrusion by sunlight into flight deck 10 through forward facing window 14. Additionally, glare shield 20 serves to shield forward facing window 14 from light emanating from displays 44 and 46 during night time operations or flight operations during inclement weather or any other condition that darkens flight deck 10. This permits the flight crew to see out of forward facing window 14 during takeoffs and landings without having their view obscured by unwanted reflections from displays 44 and 46.

In the illustrated embodiment, glare shield 20 does not overhang display 42 or display 48 and therefore does not provide those displays with shade. As will be discussed below, visors 32 and 34 may be positioned and oriented in a manner that permits them to act as supplemental glare shields that extend laterally beyond glare shield 20. When positioned in this manner, visors 32 and 34 shield displays 42 and 48, respectively, from sunlight and also to protect forward facing window 14 from light emanating from display 42 and 48.

In the illustrated embodiment, glare shield 20 is positioned directly aft of forward facing window 14 and is substantially aligned therewith. Thus, glare shield 20 provides a desirable location for mounting rail 30 and visors 32 and 34. In other embodiments, any other surface suitably positioned with respect to forward facing windows 14 may serve as a platform for mounting rail 30 and visors 32 and 34.

Recess 22 permits the mounting of rail 30 at a height approximately level with an upper surface of glare shield 20. This configuration minimizes any potential obstruction of an aircrew member's forward view over the top of glare shield 20 through forward facing window 14. In other embodiments, rail 30 may be mounted within recess 22 at a position below the upper surface of glare shield 20. In still other embodiments, rail 30 may be mounted within recess 22, but at an elevation that is above the upper surface of glare shield 20. In an example, rail 30 may be mounted at an elevation approximately half an inch above the upper surface of glare shield 20. As will be discussed below, visor 32 and visor 34 may be moved by an aircrew member to any position along rail 30 and thus provides each aircrew member with the flexibility to inhibit sun light from entering through any lower portion of forward facing window 14.

Figure 2:
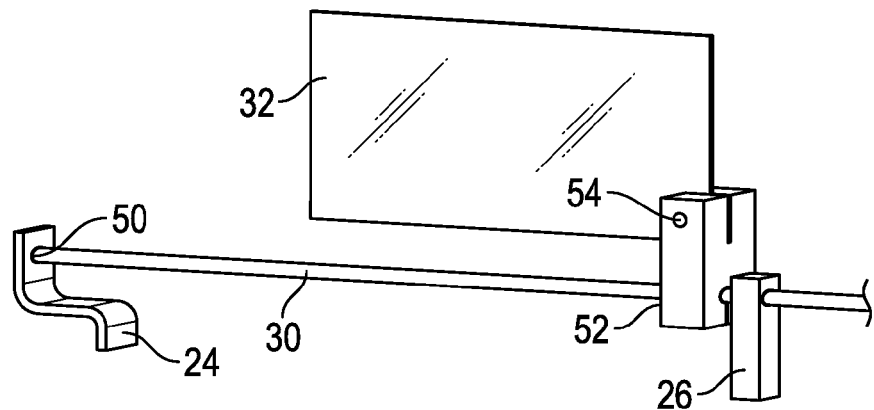
FIG. 2 is a perspective view illustrating a portion of the flight deck arrangement of FIG. 1 in a first position.

With continuing reference to FIG. 1, FIG. 2 illustrates stanchion 24, stanchion 26, rail 30 and visor 32 of flight deck arrangement 12. The remaining components of flight deck arrangement 12 have been omitted from this figure for ease of illustration and to facilitate an uncluttered observation of the illustrated components. In the illustrated embodiment, stanchion 24 has an S-shaped configuration. This configuration permits stanchion 24 to cap off an end 50 of rail 30 while being mounted within recess 22 at a location spaced apart from an end wall of recess 22. This arrangement facilitates attachment of stanchion 24 within recess 22 by providing an assembly worker with easy access to the base of stanchion 24.

Visor 32 is mounted to rail 30 via a clasp 52. In some embodiments, clasp 52 may comprise a spring clip. In other embodiments, clasp 52 may comprise a screw clip. In still other embodiments, clasp 52 may comprise any other type of mounting device suitable for mounting visor 32 to rail 30. In the illustrated embodiment, rail 30 has a circular cross section and clasp 52 has a circular opening extending through clasp 52. The circular opening permits clasp 52 to engage rail 30 and to slide back and forth along rail 30 in the direction of the longitudinal axis of rail 30. Clasp 52 may also rotate about a circumference of rail 30. This permits clasp 52 and visor 32 to be canted at any desired angle along the circumference of rail 30. In other embodiments, rail 30 may be configured with splining knot shown) or other surface features that supports clasp 52 and visor 32 at a plurality of discrete detent positions. To provide additional flexibility, visor 32 is attached to clasp 52 via a pivot 54. This arrangement permits visor 32 to pivot with respect to clasp 52 and thereby move between a landscape orientation and a portrait orientation, as needed.

In the illustrated embodiment, clasp 52 is configured to remain attached to rail 30 throughout the service life of flight deck arrangement 12. The only way to remove clasp 52 would be to slide clasp 52 off end 50 of rail 30. However, end 50 is engaged with stanchion 24. Accordingly, end 50 and stanchion 24 cooperate to inhibit clasp 52 and visor 32 from coming off of end 50. In the opposite direction, clasp 52 is obstructed from sliding past a central point of rail 30 by stanchion 26. Configured in this manner, stanchion 24 and stanchion 26 cooperate to retain clasp 52 and visor 32 on rail 30. This arrangement ensures that visor 32 will always be available to an aircrew member to block sunlight from entering flight deck 10. In other embodiments, clasp 52 may have a configuration that permits it to be removed from rail 30. Such a configuration would permit a flight crew member to relocate visor 32 to other locations within the flight deck, as desired.

Figure 3:
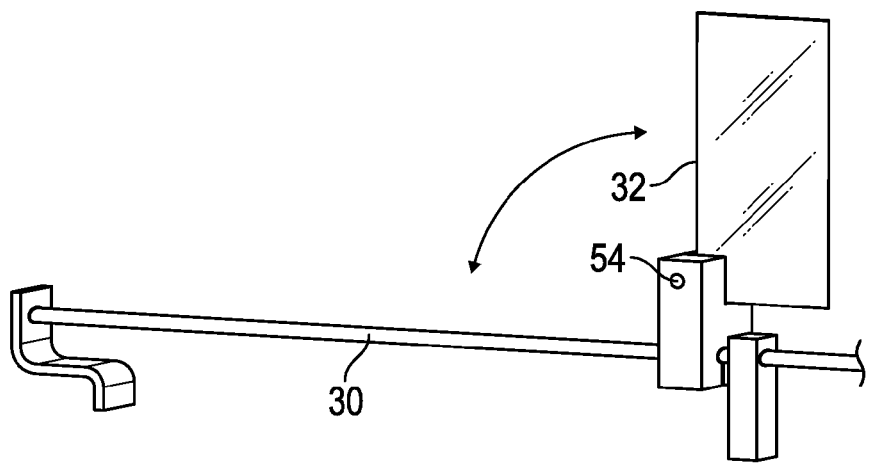
FIG. 3 is a perspective view illustrating a portion of the flight deck arrangement of FIG. 1 in a second position.
Figure 4:
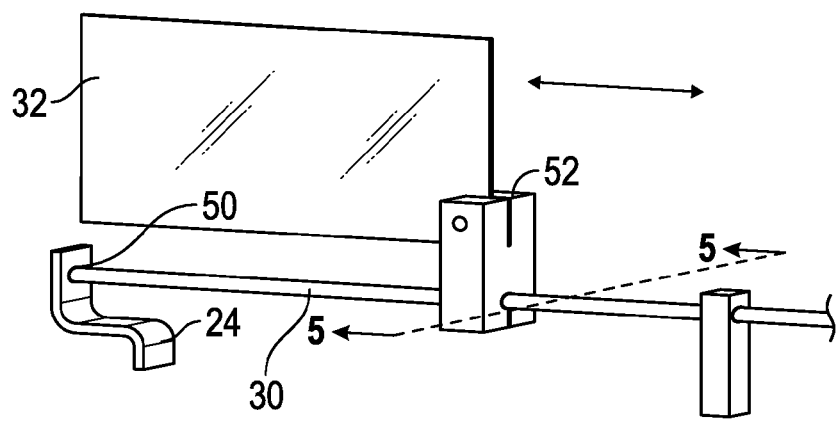
FIG. 4 is a perspective view illustrating a portion of the flight deck arrangement of FIG. 1 in a third position.
Figure 5:
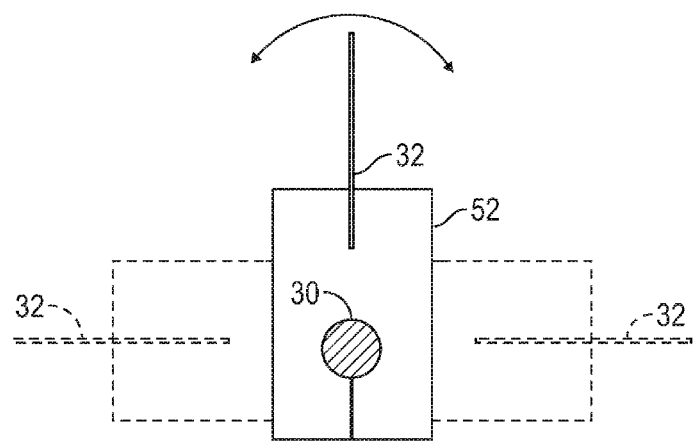
FIG. 5 is a cross-sectional view taken along the line 5-5 of FIG. 4.
Figure 6:
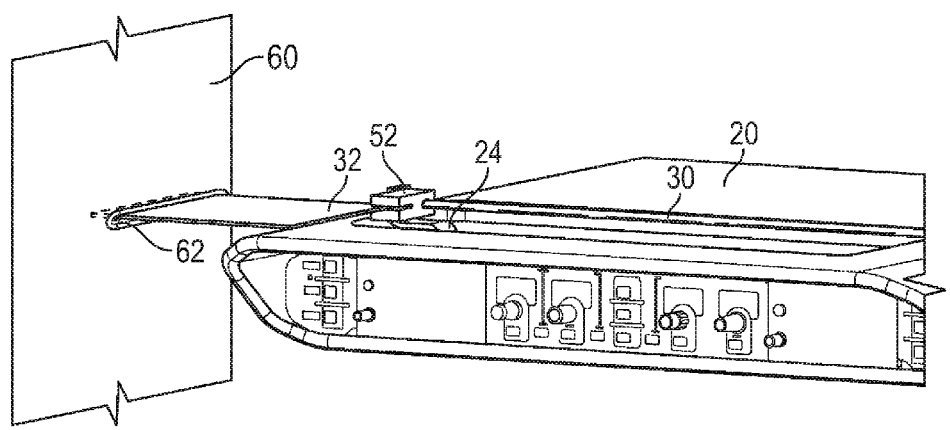
FIG. 6 is a perspective view illustrating a portion of the flight deck arrangement of FIG. 1 in a fourth position.

With continuing reference to FIGS. 1-2, FIG. 3 illustrates visor 32 pivoted about pivot 54 to an upright position (portrait orientation). While oriented in this manner, visor 32 can be slid along rail 30, rotated about a circumference of rail 30, or both to provide protection against sunlight entering flight deck 10 through vertically oriented lapses in coverage provided by conventional sun screens.

With continuing reference to FIGS. 1-3, FIG. 4 illustrates visor 32 after it has been slid towards end 50 of rail 30. Visor 32 can be moved even further to the left (from the perspective of FIG. 4) until clasp 52 is obstructed by further movement by stanchion 24. In that case, visor 32 would extend beyond end 50 of rail 30. This may be necessary to inhibit sunlight from entering flight deck 10 through a left end (from the perspective of FIG. 4) of forward facing window 14.

With continuing reference to FIGS. 1-4, FIG. 5 illustrates a cross section taken along the line 5-5. In this view, the circular cross section of rail 30 and the circular opening of clasp 52 engaging rail 30 is evident. Visor 32 can be rotated in either a clockwise or a counter clockwise direction, as illustrated by the phantom representations of visor 32 rotated to both forward and aft positions. In the embodiment of flight deck arrangement 12 illustrated in FIG. 1, further clockwise or counterclockwise rotation of visor 32 would be obstructed by the upper surface of glare shield 20.

With continuing reference to FIGS. 1-5, FIG. 6 illustrates visor 32 serving as a supplemental glare shield to assist glare shield 20. Visor 32 has been rotated around the circumference of rail 30 to a horizontal orientation and has been slid along rail 30 to a point where clasp 52 is obstructed from further movement by stanchion 24. In this position, visor 32 extends beyond end 50 of rail 30 and beyond a lateral end of glare shield 20. When arranged in the manner illustrated, visor 32 provides glare-shield-like protection for display 42 and/or for forward facing window 14, depending on whether it is day or night. To assist clasp 52 in supporting visor 32 in this fully extended position, a pillar 60 includes a recess 62 oriented horizontally and configured to receive an end of visor 32 and further configured to support visor 32 in the illustrated orientation. In other embodiments, recess 62 may have an orientation other than horizontal or pillar 60 may have multiple recesses, each oriented at a different angle to support an end of visor 32 at multiple angles.

With continuing reference to FIGS. 1-6, FIG. 7 illustrates an embodiment of flight deck arrangement 12 where a clasp 52' and a clasp 53 are configured to permit detachment of visors 32 and 34, respectively, from rail 30. This provides the aircrew members with the flexibility to relocate visor 32 or visor 34 from one side of stanchion 26 to the other, or to other rails mounted inside flight deck 10, if so equipped. In this way, when the sun is located on the port side of an aircraft, both visors can be positioned on the left side of stanchion 26 and can cooperate to inhibit entry of sunlight into the port side pane (pane 16). Similarly, when the sun located off the starboard side of the aircraft, both visors can be positioned on the right side of stanchion 26 and can cooperate to inhibit entry of sunlight into the starboard side pane (pane 18).

With continuing reference to FIGS. 1-7, FIG. 8 illustrates a side view of glare shield 20, rail 30, clasp 52, visor 32 and stanchion 26. Stanchion 24 has been omitted for ease of illustration. In this view, the recessed arrangement between recess 22 and rail 30 can best be seen. Rail 30 is positioned partially above an upper surface of glare shield 20 and partially below the upper surface of glare shield 20. The upper surface of glare shield 20 is represented by phantom line 64, which substantially bisects rail 30. The positioning of rail 30 partially below and partially above an upper surface of glare shield 20 enables visor 32 to be folded substantially flat against the upper surface of glare shield 20, as illustrated. This is desirable on occasions when the sun is not visible through forward facing window 14 and there is no need to deploy visor 32. By folding substantially flat against an upper surface of glare shield 20, visor 32 and rail 30 presents an extremely low profile that does not interfere with an aircrew member's ability to see out of forward facing window 14. Despite the illustration depicting rail 30 at an elevation that is partially above and partially below the upper surface of glare shield 20, it should be understood that in other embodiments, it is possible to mount rail 30 at an elevation above the upper surface of glare shield 20 (e.g., a quarter of an inch, a half of an inch, and the like) without departing from the teachings of the present disclosure and without presenting an unacceptable obstruction to the aircrew through the front windows of the aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck arrangement comprising:
   a window;
   a surface disposed proximate the window and positioned below the window;
   a rail mounted to the surface, the rail disposed proximate the window and positioned below the window, the rail extending along the surface in a direction generally aligned with a lower portion of the window;

a visor mounted to the rail and selectively positionable along the rail; and an upright pillar bordering the window, the upright pillar including a recess, wherein an end of the visor is configured to reside within the recess and wherein the recess is configured to support the end of the visor when the visor is positioned at a longitudinal end of the rail.

2. The flight deck arrangement of claim 1, wherein the surface comprises a glare shield.

3. The flight deck arrangement of claim 1, wherein the visor is pivotally mounted to the rail in a manner that permits the visor to pivot about a longitudinal axis of the rail.

4. The flight deck arrangement of claim 1, wherein the visor comprises a translucent material.

5. The flight deck arrangement of claim 1, wherein a lateral length of the window and a length of the rail are substantially equal.

6. The flight deck arrangement of claim 1, wherein the window comprises a plurality of window panes.

7. The flight deck arrangement of claim 1, wherein the visor is mounted to the rail in a cantilever manner.

8. The flight deck arrangement of claim 7, wherein the visor is configured to extend beyond a longitudinal end of the rail when the visor is moved to the longitudinal end of the rail.

9. The flight deck arrangement of claim 1, wherein the surface includes a recess extending along the surface and wherein the rail is mounted within the recess.

10. The flight deck arrangement of claim 9, wherein the rail is mounted within the recess via a plurality of stanchions and wherein the plurality of stanchions are dimensioned to support the rail such that a first portion of the rail protrudes above the surface and such that a second portion of the rail is recessed below the surface.

11. The flight deck arrangement of claim 1, further comprising a clasp, wherein the visor is mounted to the rail via the clasp.

12. The flight deck arrangement of claim 11, wherein the clasp is configured to removably mount the visor to the rail.

13. The flight deck arrangement of claim 11, wherein the clasp is configure to permit the visor to pivot along an axis substantially normal to a longitudinal axis of the rail.

14. The flight deck arrangement of claim 1, wherein the rail is mounted to the surface via a plurality of stanchions.

15. The flight deck arrangement of claim 14, wherein the rail is mounted to the surface by a first stanchion of the plurality of stanchions and by a second stanchion of the plurality of stanchions, the first stanchion disposed at a first longitudinal end of the rail and the second stanchion disposed at a second longitudinal end of the rail.

16. The flight deck arrangement of claim 15, wherein the first stanchion and the second stanchion are configured to obstruct movement of the visor beyond the first longitudinal end of the rail and the second longitudinal end of the rail, respectively.

17. The flight deck arrangement of claim 15, wherein the first stanchion and the second stanchion each have a generally S-shaped configuration.

18. The flight deck arrangement of claim 15, wherein the rail is mounted to the surface by a third stanchion of the plurality of stanchions disposed proximate a center of the rail.

19. A flight deck arrangement comprising:

a forward facing window including a first pane and a second pane;

a glare shield disposed proximate the forward facing window and positioned below the forward facing window, the glare shield including a recess defined in an upper surface of the glare shield, the recess extending in a direction generally aligned with the forward facing window;

a first stanchion;

a second stanchion;

a third stanchion;

a rail mounted to the glare shield via the first stanchion, the second stanchion, and the third stanchion, the rail mounted within the recess, the first stanchion engaging the rail at a first longitudinal end of the rail, the second stanchion engaging the rail at a second longitudinal end of the rail, the third stanchion engaging the rail proximate a center of the rail, the rail disposed proximate the forward facing window and positioned below the forward facing window, the rail extending along the glare shield in the direction generally aligned with the forward facing window, the rail extending along the glare shield for a length substantially equal a combined length of the first pane and the second pane;

a first visor mounted to the rail between the first stanchion and the third stanchion and selectively positionable along the rail; and a second visor mounted to the rail between the second stanchion and the third stanchion and selectively positionable along the rail wherein the first stanchion and the second stanchion each have a generally S-shaped configuration.

20. A flight deck arrangement comprising:

a window;

a surface disposed proximate the window and positioned below the window;

a rail mounted to the surface, the rail disposed proximate the window and positioned below the window, the rail extending along the surface in a direction generally aligned with a lower portion of the window; and a visor mounted to the rail and selectively positionable along the rail, wherein the rail is mounted to the surface via a plurality of stanchions, wherein the rail is mounted to the surface by a first stanchion of the plurality of stanchions and by a second stanchion of the plurality of stanchions, the first stanchion disposed at a first longitudinal end of the rail and the second stanchion disposed at a second longitudinal end of the rail, and wherein the first stanchion and the second stanchion each have a generally S-shaped configuration.

* * * * *